(12) United States Patent
Jenkins et al.

(10) Patent No.: US 7,240,682 B2
(45) Date of Patent: Jul. 10, 2007

(54) WASHING FLUID PUMP

(75) Inventors: Martyn Jenkins, Gwent (GB); David J. Frost, Vale of Glamorgan (GB)

(73) Assignee: Kautex Textron GmbH & Co. KG, Bonn (DE)

( * ) Notice: Subject to any disclaimer, the term of this patent is extended or adjusted under 35 U.S.C. 154(b) by 559 days.

(21) Appl. No.: 10/408,544

(22) Filed: Apr. 7, 2003

(65) Prior Publication Data
US 2003/0188772 A1    Oct. 9, 2003

(30) Foreign Application Priority Data
Apr. 9, 2002    (EP) .................................. 02007951

(51) Int. Cl.
*B08B 3/00*    (2006.01)
*F04B 17/03*    (2006.01)

(52) U.S. Cl. ...................... 134/188; 134/123; 415/144; 415/206; 416/150; 416/205; 417/423.6; 417/423.1; 417/212

(58) Field of Classification Search ................ 134/188, 134/123; 415/144, 206; 416/205, 150; 417/423.1, 417/212, 423.6
See application file for complete search history.

(56) References Cited
U.S. PATENT DOCUMENTS 1,959,106 A * 5/1934 McSSing .................... 415/131
2,877,710 A * 3/1959 Barnhart ...................... 415/74
3,404,631 A * 10/1968 Nixon .......................... 415/126
3,431,855 A * 3/1969 Elyashev et al. ............. 415/73
4,392,777 A * 7/1983 Huttlin ........................ 415/131
4,815,930 A * 3/1989 Hutchison ................... 415/117
5,601,398 A * 2/1997 Treiber et al. ............. 415/55.1
5,641,275 A * 6/1997 Klein et al. ................. 417/420
5,846,049 A * 12/1998 DuPuis ....................... 415/131
5,993,176 A * 11/1999 Kingsford et al. .......... 417/420

FOREIGN PATENT DOCUMENTS
FR    2 654 470    5/1991
FR    2 703 409    10/1994

* cited by examiner

Primary Examiner—Michael Barr
Assistant Examiner—Sarah E. Husband
(74) Attorney, Agent, or Firm—Grossman Tucker Perreault & Pfleger, PLLC

(57) ABSTRACT

The invention concerns a washing fluid pump (1) for windows and/or headlamp cleaning installations on motor vehicles including at least one motor, at least one pump housing (2) with at least one impeller (11) arranged therein, at least one intake (8) and at least two selectively actuable outlets (7). The washing fluid pump (1) is distinguished in that the pump housing (2) includes at least two pump chamber regions which are arranged in mutually superposed relationship, that at least two outlets (7) are associated with different pump chamber regions, and the impeller (11) is axially displaceably supported in the pump housing (2) in such a way that it can assume its operative position selectively in one pump chamber region or the other.

12 Claims, 7 Drawing Sheets

WASHING FLUID PUMP

Figure 1:
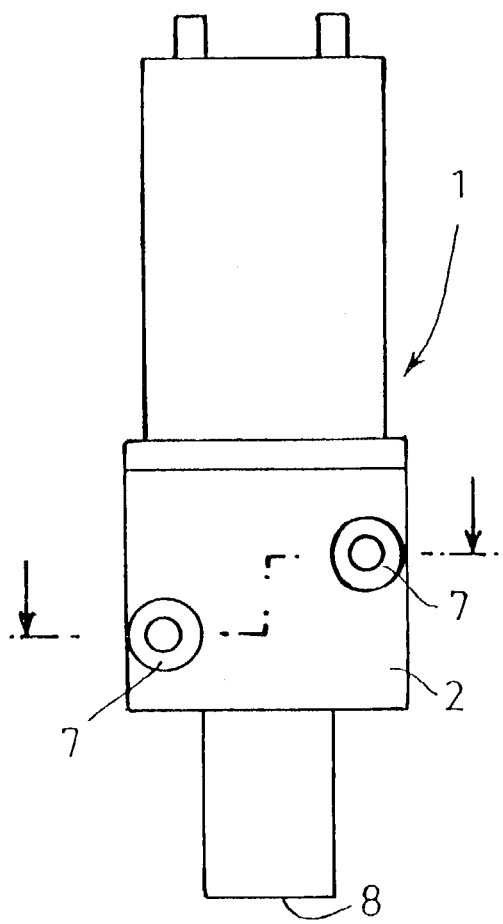

The present invention concerns a washing fluid pump for windows and/or headlamp cleaning installations on motor vehicles including at least one motor, at least one pump housing with at least one impeller arranged therein, at least one intake and at least two selectively actuable outlets for washing fluid.

Washing fluid pumps of that kind are known in the form of small 2-way pumps which are operated with a pole-commutable 12volt DC motor. Those pumps serve for example the front and rear washing nozzles of the window cleaning installation of a motor vehicle. For that purpose, there are provided two pump outlets which each supply washing fluid, depending on the respective direction of rotation of the electric motor. The impeller is usually a simple vane wheel with radially extending vanes and the washing fluid outlets open tangentially on one side of the pump housing into the pump chamber. In that way, depending on the respective direction of rotation of the electric motor, one pump outlet or the other is subjected to more or less pressure so that it is necessary for the outlets of the washing fluid pump to be switched by a valve which can be changed over by the fluid pressure. This arrangement usually employs a valve with a floatingly supported valve body which, by virtue of a higher fluid pressure at one outlet, automatically closes off the respective other outlet of the washing fluid pump.

Those known washing fluid pumps have proven themselves to be most appropriate in a practical context, but they do suffer from the disadvantage that a maximum of two consuming devices can be connected thereto. If further washing devices are to be supplied with washing fluid, for example in addition the two front headlamps of a motor vehicle, it is then necessary to provide a further washing fluid pump. In addition there is the consideration of structurally simplifying the known washing fluid pump.

Therefore the object of the present invention is to structurally improve a washing fluid pump of the kind set forth above. A further object of the invention is to so improve the washing fluid pump that if necessary it is possible to provide more than two washing fluid outlets.

That object is attained by a washing fluid pump, which is characterised in that the pump housing includes at least two pump chamber regions which are arranged in mutually superposed relationship, that at least two outlets are associated with different pump chamber regions, and the impeller is axially displaceably supported in the pump housing in such a way that it can assume its operative position selectively in one pump camber region or the other.

By virtue of adopting such an arrangement it is possible for example to omit a valve which can be switched over by means of fluid pressure, if the pump has two outlets which are disposed one above the other. By virtue of displacement of the impeller into one pump chamber region or the other, with each of which a respective outlet is associated, it is possible for each of the outlets to be supplied with the washing fluid, independently of the respective other outlet. Such an arrangement also permits the washing fluid pump to be of a particularly compact design, in particular when a plurality of consuming devices are to be served.

Preferably, the pump chamber regions are delimited by upper and lower chamber walls which are arranged axially displaceably with the impeller in the pump housing.

The upper and lower chamber walls are desirably guided non-rotatably in the pump housing.

There is no need for the pump chamber regions to be sealed off, in the region of the upper and lower chamber walls.

For the intake of the fluid to be pumped, one of the chamber walls and preferably the lower chamber wall can be provided with at least one aperture therethrough.

In a preferred alternative configuration of the washing fluid pump with two outlets, the impeller is axially movably supported on a portion of the motor shaft, which portion is provided with a screwthread drive. Desirably, the impeller is movable between two end abutments of the screwthread drive between defined end positions.

The impeller can be provided with upper and lower entrainment members which respectively co-operate with a corresponding entrainment profile of the end abutments of the screwthread drive.

Preferably, the entrainment members provided on the impeller are in the form of entrainment pins.

In an alternative embodiment of the washing fluid pump in accordance with the invention, it is provided that the motor shaft is arranged axially movably, with the impeller fixedly attached to the shaft.

In accordance with a second embodiment of the invention it is provided that the electric motor has an additional armature which is movable by way of a switchable solenoid arranged in the motor housing.

The washing fluid pump which is designed in that way can be provided with four outlets, of which each two are arranged in mutually superposed relationship.

Desirably in that case each two outlets can be respectively switched by way of a valve which can be changed over by the fluid pressure, of course due to the change of the rotary direction of the shaft.

At any event the outlets are respectively arranged tangentially with respect to the pump chambers, and the electric motor is in the form of a pole-commutable DC motor.

Figure 2:
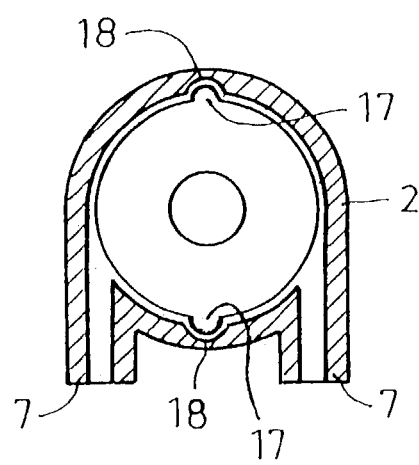
Figure 3:
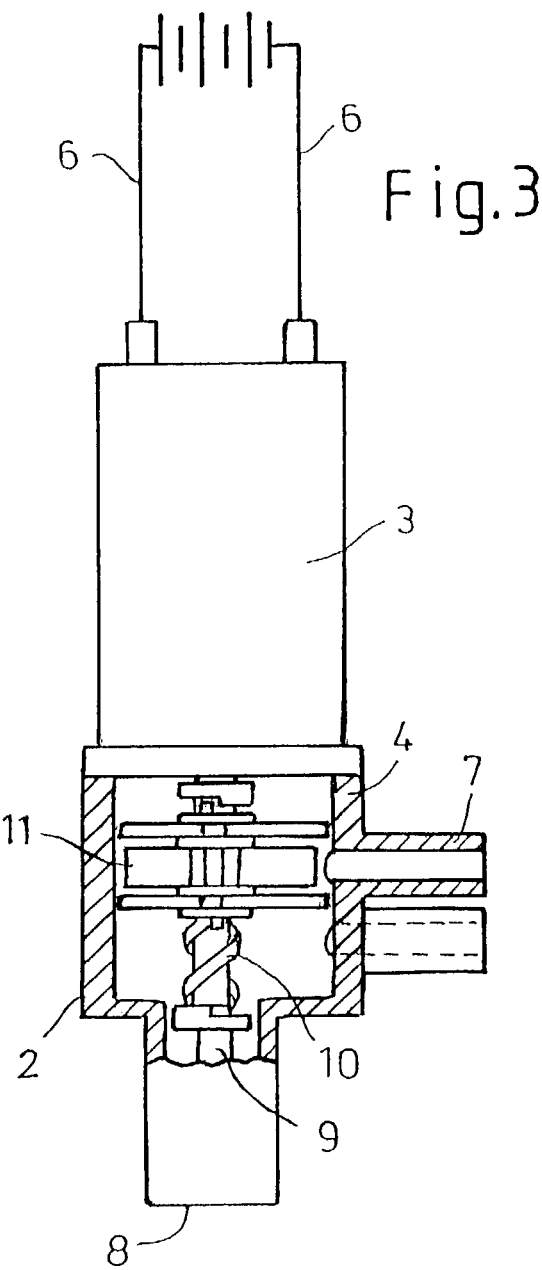
Figure 4:
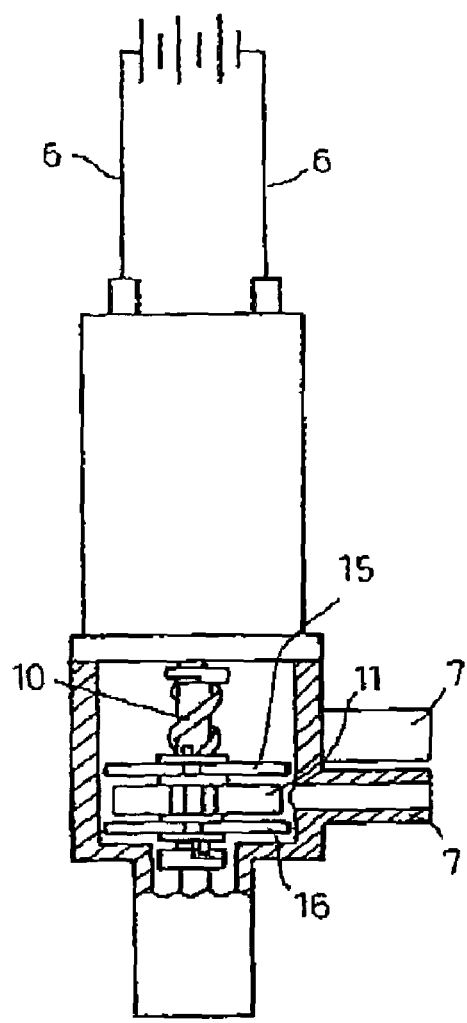
Figure 5:
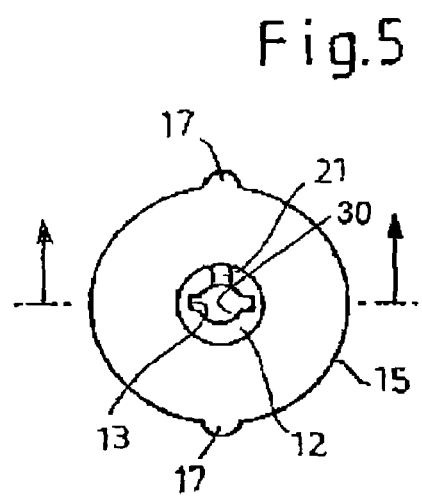
Figure 6:
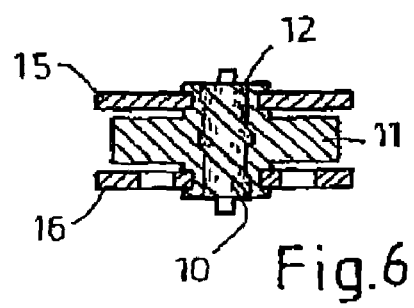
Figure 7:
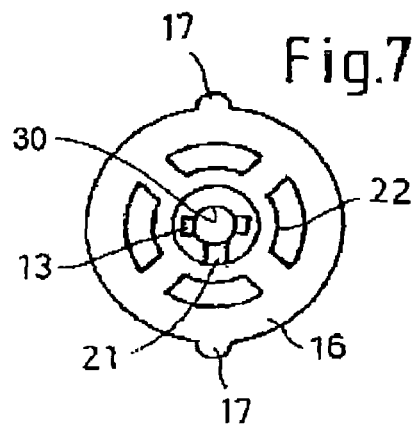
Figure 8:
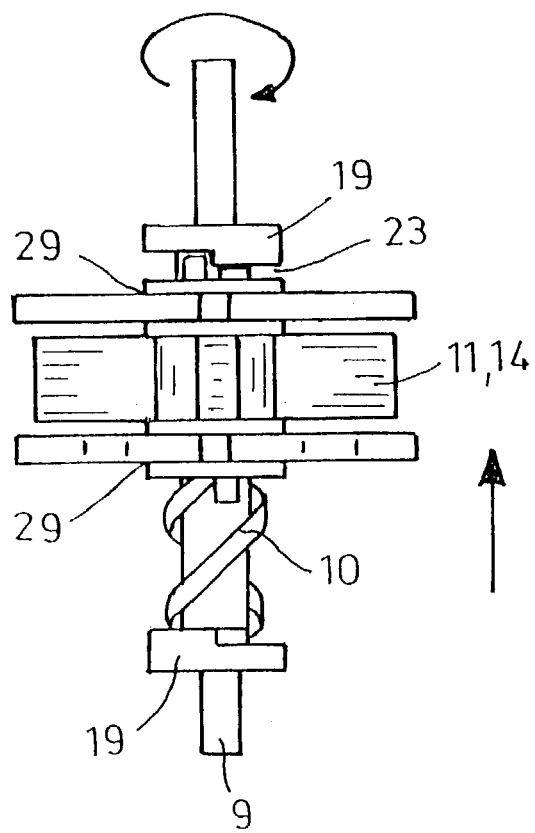
Figure 9:
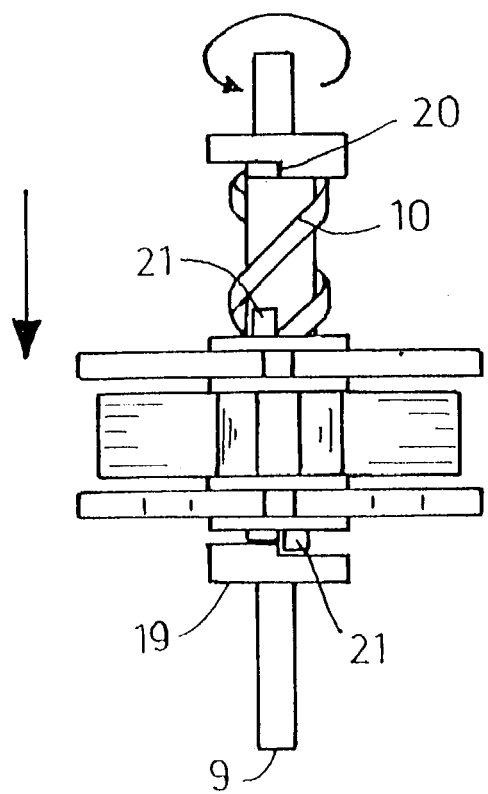
Figure 10:
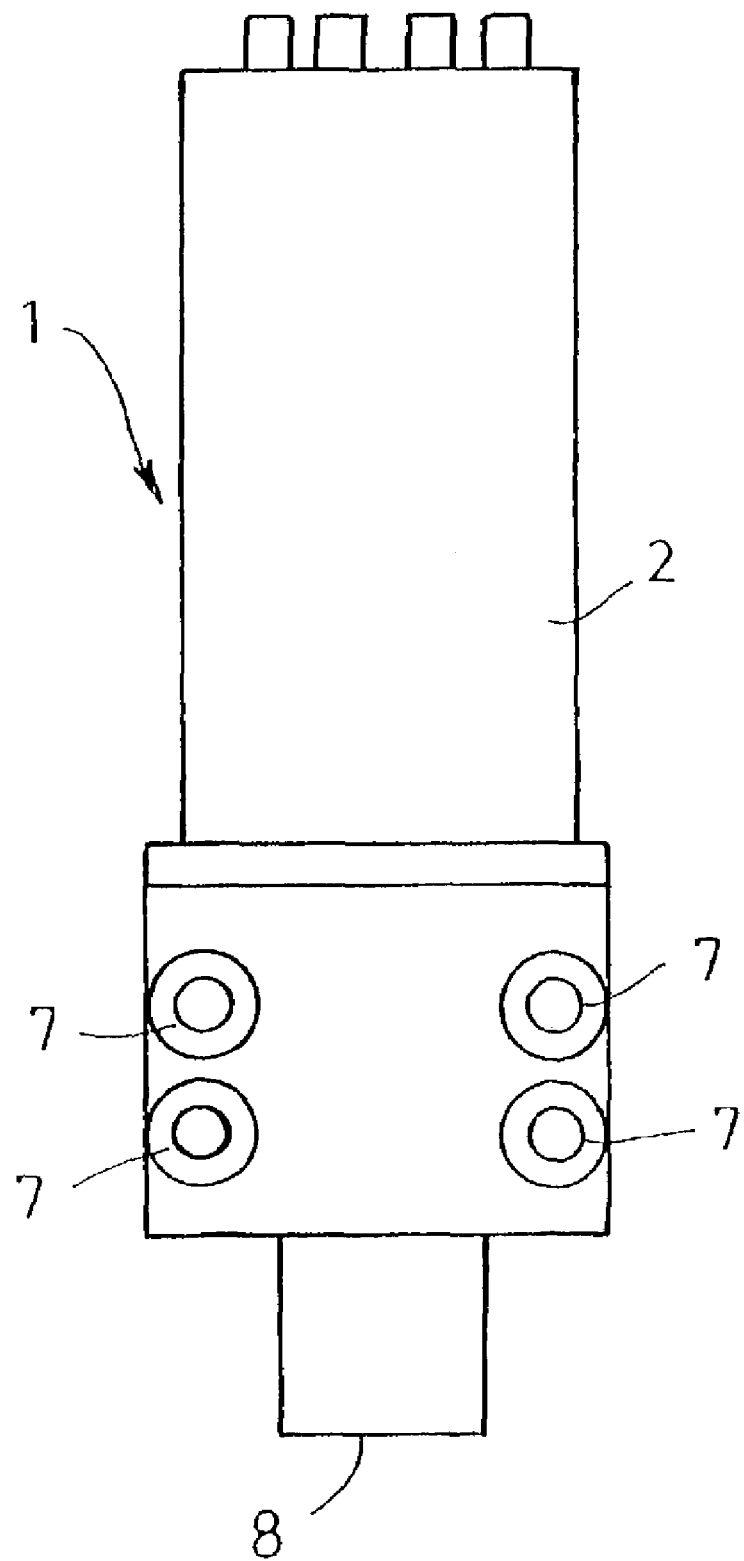
Figure 11:
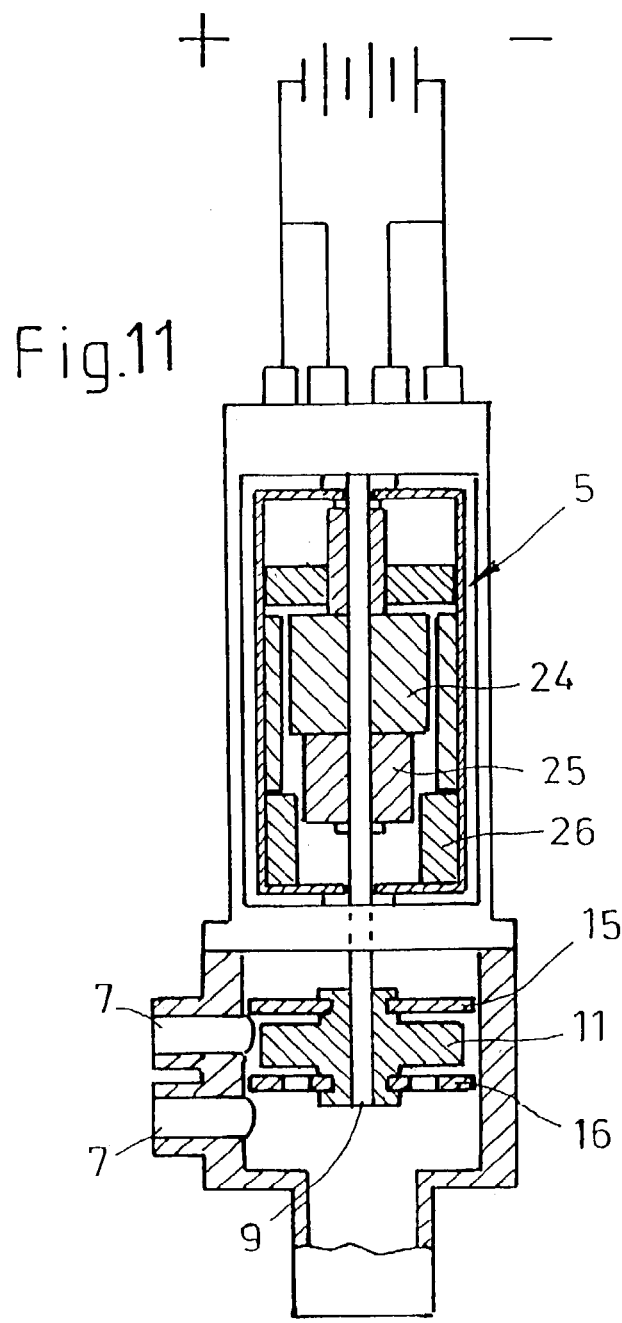
Figure 12:
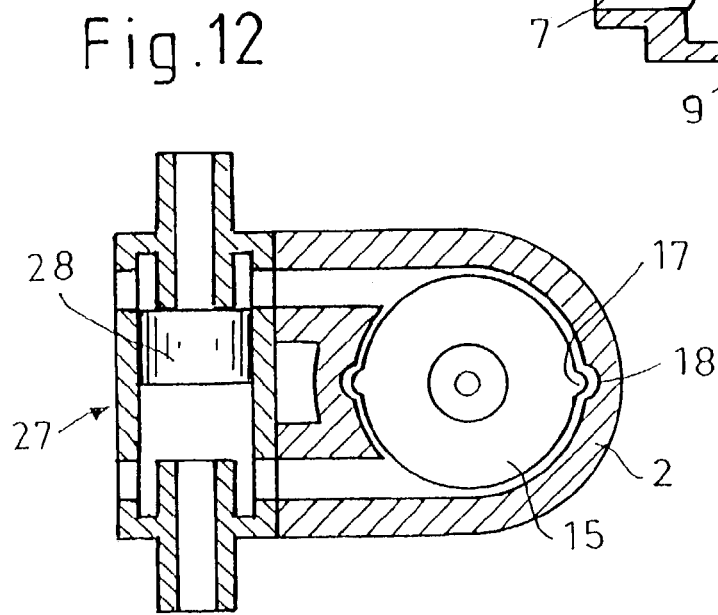
Figure 13:
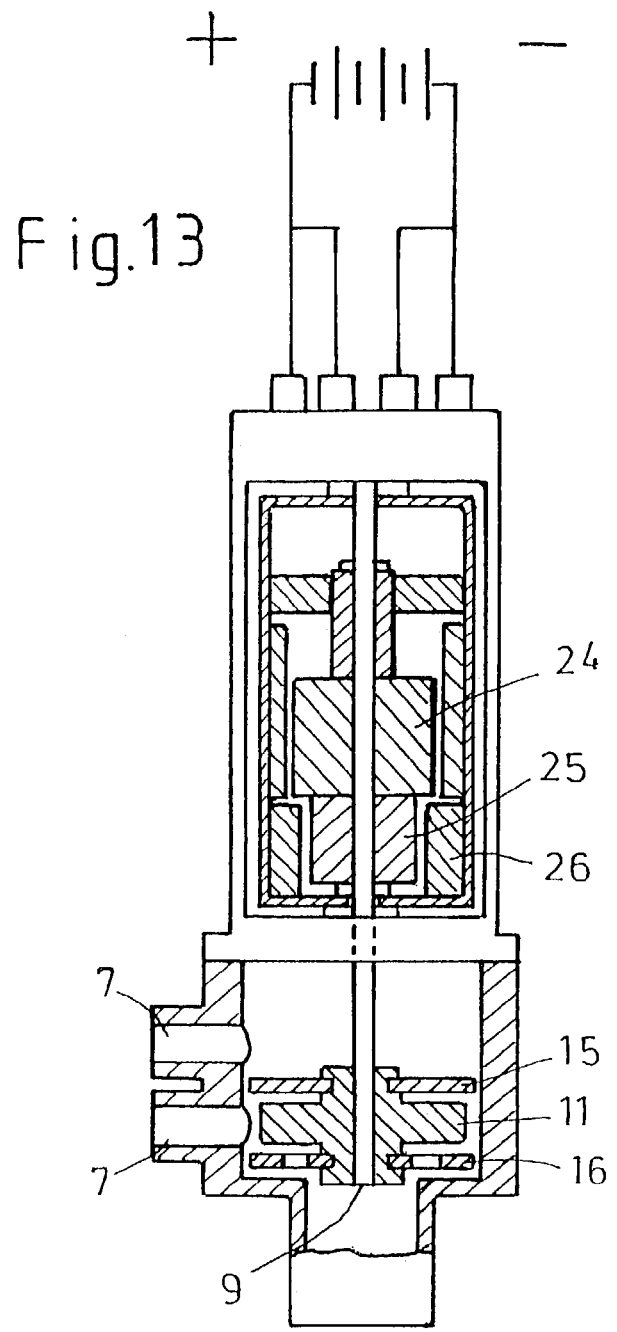
Figure 14:
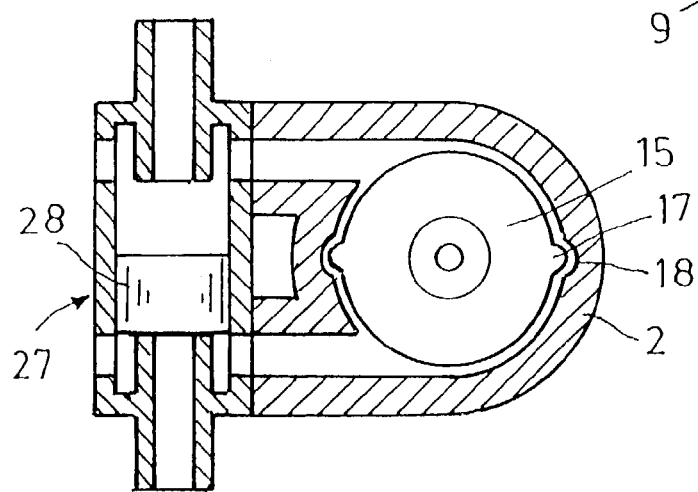
Figure 15:
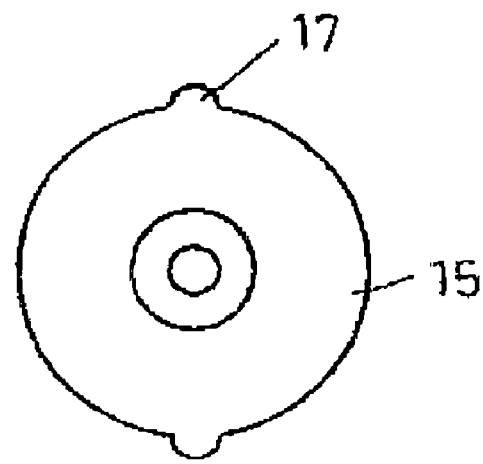
Figure 16:
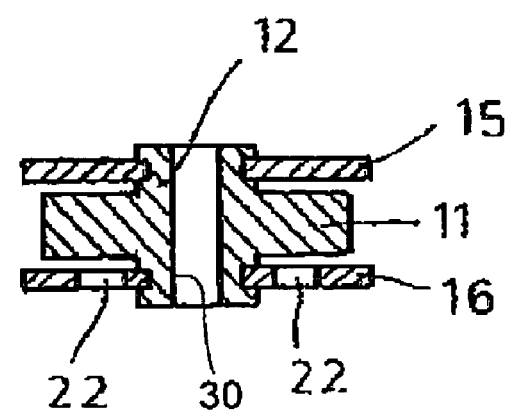
Figure 17:
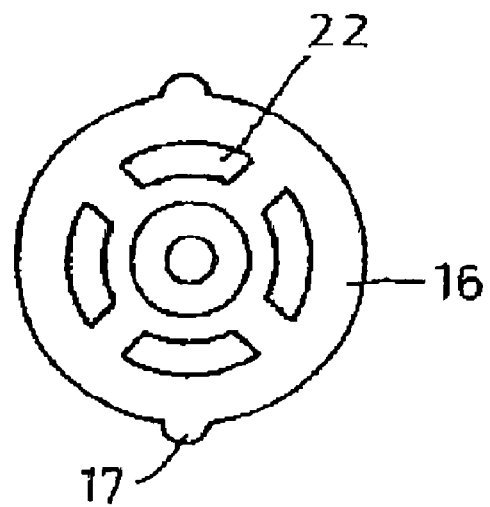

The invention is described in greater detail hereinafter by means of two embodiments illustrated in the drawings in which:

FIG. 1 shows a diagrammatic view of the washing fluid pump in accordance with the first embodiment of the invention, FIG. 2 shows a view in cross-section taken along line II—II in FIG. 1, FIG. 3 is a view in partial longitudinal section through the washing fluid pump shown in FIG. 1, with the impeller in the upper end position, FIG. 4 shows a view in section corresponding to that shown in FIG. 3, with the impeller in the lower end position, FIG. 5 shows a plan view of the arrangement of the upper chamber wall/impeller, FIG. 6 shows a view in section taken along line VI—VI in FIG. 5, FIG. 7 shows a view from below of the arrangement of the lower chamber wall/impeller, FIGS. 8 and 9 show views on an enlarged scale of the arrangement of the impeller and the chamber walls on the motor shaft, FIG. 10 shows a diagrammatic view of a washing fluid pump in accordance with the second embodiment of the invention, FIG. 11 is a view in partial longitudinal section through the washing fluid pump shown in FIG. 10, with the impeller in the upper end position, FIG. 12 shows a view in cross-section through the washing fluid pump of FIG. 11 in the region of the upper outlets and further including a pressure actuated valve, FIG. 13 shows a view in partial longitudinal section through the washing fluid pump in accordance with the second embodiment of the invention, with the impeller in the lower end position, FIG. 14 shows a view in cross-section through the washing fluid pump in the region of the lower outlets including a pressure actuated valve, FIG. 15 shows a plan view of the arrangement of the upper chamber wall/impeller in accordance with the second embodiment of the invention, FIG. 16 shows a view in section through the arrangement illustrated in FIG. 15, and FIG. 17 shows a view of the arrangement of the lower chamber wall/impeller in accordance with the second embodiment of the invention.

The washing fluid pump 1 shown in FIGS. 1 to 9 includes a pump housing 2 with a motor region 3 and a hydraulic region 4 which are sealed off/relative to each other. Disposed in the motor portion 3 is a pole-commutable DC motor 5 while reference 6 denotes the connecting terminals of the DC motor 5. In the case of the embodiment illustrated in FIGS. 1 to 9, the pump housing 2 is provided with two outlets 7 arranged in mutually superposed relationship, as well as a centrally and axially arranged intake 8 for washing fluid. As is apparent in particular from joint consideration of FIGS. 1 and 2, the outlets 7 communicate in approximately tangential relationship with the cylindrical pump housing 2 on one side thereof at different levels.

A motor shaft 9 of the DC motor 5 passes through the pump housing 2. Arranged on the motor shaft 9 in the region of the pump housing 2 is a double-flight helix 10, on which an impeller identified by reference numeral 11 is axially movably guided. For that purpose, the axial bore 30 of the impeller shaft 12 is provided with guide grooves 13 (see FIGS. 5 and 7) which, with the helix 10, form a screwthread drive.

The impeller 11 is provided with radially extending impeller blades 14 and is arranged between an upper and a lower chamber wall 15, 16 which each together with the pump housing 2 define a respective pump chamber. The chamber walls 15, 16 are guided in the pump housing 2 axially displaceably with the impeller 11 but non-rotatably with respect to the pump housing 2. For that purpose, provided at the outer periphery of the upper and lower chamber walls 15, 16 are respective holding projections 17 which co-operate with guide grooves 18 of the pump housing 2 as means for preventing rotation of the chamber walls. In other words, the chamber walls 15, 16 are each held in respective grooves 29 in the impeller shaft 12 and extending therearound.

Provided on the motor shaft 9 in the region of the pump housing 2 at each end of the helix are respective end abutments in the form of an upper and a lower collar 19. Each of the collars 19 is provided, on its side which is respectively towards the impeller 11, with an abutment shoulder 20 which co-operates with a respective entrainment pin 21 provided on the respective end faces of the impeller shaft 12. The length and position of the entrainment pins 21 is such that a gap indicated at 23 in FIG. 8 remains between the end face of the impeller shaft 12 and the respective collar 19 in the upper and lower end positions of the impeller 11, in other words the impeller shaft 12 and the collar 19 do not touch each other.

The mode of operation of the washing fluid pump 1 in accordance with the first embodiment of the invention as described above will now be described.

Referring to FIG. 3 the washing fluid pump 1 is shown therein in an operating condition in which the impeller 11 is in the upper end position. The motor shaft 9 or the rotor of the DC motor 5 are rotating in the clockwise direction, as viewed from the connecting terminals 6. The abutment shoulder 20 of the upper collar 19 drives the entrainment pin 21 in the clockwise direction and the outlet 7 which is the upper outlet shown in FIG. 3 is supplied with washing fluid. The washing fluid passes through the centrally and axially arranged intake 8 into the pump housing 2, flows through fluid passages indicated at 22 in FIG. 7 in the lower chamber wall 16 (on the intake suction side) and into the pump chamber formed between the upper and lower chamber walls 15, 16 and the pump housing 2, and is there driven radially outwardly through the upper outlet 7 by the impeller blades 14.

If now the DC motor 5 is switched over so that the direction of rotation thereof is reversed, then the impeller 11 is moved on the helix 10 into the lower limit position as shown in FIGS. 4 and 5 until the entrainment pin 21 comes to bear against the abutment shoulder 20 on the lower collar 19. As viewed from the connecting terminals 6, the motor shaft 9 is now rotating in the counter-clockwise direction. In the course of its downward movement the impeller 11 has entrained the upper chamber wall 15 and the lower chamber wall 16. The impeller 11 as well as the pump chamber formed by the upper and lower chamber walls 15, 16 and the pump housing 2 are now arranged at the height of the lower outlet 7 and the lower outlet 7 is now supplied with washing fluid.

Reference will now be made to FIGS. 8 and 9 to view the impeller 11 as well as the upper and lower chamber walls 15, 16 and the arrangement thereof on the helix 10 in the region of the motor shaft 9 which passes through the hydraulic portion 4 of the washing fluid pump 1. In FIG. 8, the impeller 11 is in the upper end position and the motor shaft 9 is rotating in the clockwise direction as viewed from above in FIG. 8. FIG. 9 shows the reversal in the direction of rotation, with the consequence that the impeller 11 moves into the lower end position. In this embodiment, the helix 10 is formed by a screwthread portion fitted on to the motor shaft 9, with a double-flight motion thread. As indicated above, that screwthread portion includes two end abutments, in the form of the collars 19, for affording two defined end positions for the impeller 11. As was also described above, the length and position of the entrainment pins 21 is so selected that the end faces of the impeller shaft 12 cannot come to bear against the collars 19, but that on the contrary a gap 29 is formed therebetween. That is intended to ensure that the impeller 11 does not jam in the upper or lower end position.

Reference will now be made to FIGS. 10 to 17 showing a second embodiment of the washing fluid pump 1 according to the invention. In this second embodiment of the invention the motor shaft 9 and the rotor 24 of the DC motor 5 are supported to be axially movable. In this case, in addition to the wound rotor 24 on the motor shaft 9 there is an armature 25 which is movable by way of a switchable solenoid 26. Depending on the respective magnetisation of the solenoid 26 the armature 25 is repelled or attracted, which causes a stroke movement on the part of the armature 25 and the motor shaft 9 which is non-rotatably connected thereto.

Unlike the first embodiment of the invention as described above with reference to FIGS. 1 to 9, the impeller 11 is fixed on the end of the motor shaft 9 in the hydraulic portion 4 of the pump housing 2. With the stroke movement of the motor shaft 9, the impeller 11 therefore also performs such a movement.

Looking now in particular at FIG. 10 it will be seen that the pump housing 2 is provided with a total of four outlets 7 which are arranged in pairs with the outlets 7 of each pair arranged in mutually superposed relationship. It will be seen from FIG. 12 that, as in the first embodiment described above, the outlets 7 communicate with the interior of the pump housing 2 in tangential relationship therewith and on one side thereof.

Also as in the first embodiment, the washing fluid pump 1 includes upper and lower chamber walls as indicated at 15 and 16, which with the pump housing 2 form a pump chamber. As in the case of the first embodiment, the upper and lower chamber walls 15, 16 are each in the form of a substantially disc-shaped element, wherein those elements co-operate in positively locking relationship with the impeller shaft 12 in such a way that they also move with the stroke movement of the impeller 11. They are provided for that purpose with holding projections 17 which, together with the corresponding guide grooves 18 in the pump housing 2, provide that the upper and lower chamber walls 15, 16 are non-rotatable in relation to the pump housing 2, when the impeller 11 performs its rotational movement.

Referring to FIG. 11, therein the impeller 11 is illustrated in its upper position in which the two upper outlets 7 of the washing fluid pump 1 are subjected to the action of fluid pressure, in which respect one outlet 7 or the other is subjected to a greater pressure, depending on the respective direction of rotation of the DC motor 5. Therefore, in the case of the second embodiment of the washing fluid pump which is in the form of a 4-way pump, that is to say with four outlets, it is necessary to provide additional fluid pressure-actuated valves 27, more specifically a respective valve 27 between each two outlets 7. Attention is directed to FIGS. 12 and 14 showing such an arrangement, with FIG. 12 illustrating the valve 27 arranged between the upper outlets 7 as shown in FIG. 10, and FIG. 14 showing the valve 27 arranged between the lower outlets 7 in FIG. 10.

The valves 27 each include a floatingly supported valve body 28 which at each side thereof affords respective operative faces for the fluid pressure. Depending on which of the tangentially oppositely disposed outlets 7 is at the greater pressure, the valve body 28 is moved into one end position or the other and in that end position closes the respective outlet 7, thereby ensuring that only one outlet 7 is subjected to the action of pressure, in a given pump chamber region of the pump housing 2.

As mentioned above, the washing fluid pump 1 shown in FIGS. 10 to 17 is in the form of a 4-way pump, with the pump also having a centrally and axially arranged intake as indicated at 8. Control of the washing fluid pump 1 is effected both by reversing the direction of rotation of the DC motor 5 and also by switching the solenoid 26.

When the impeller 11 is in the position shown in FIG. 11 either one outlet 7 or the other outlet 7, which are arranged at the same level on the pump housing, will be respectively subjected to pressure, by virtue of a reversal in the direction of rotation of the DC motor 5, in which case the valve 27 is operative to ensure that in that situation the outlet 7 which is disposed at the same level in correspondingly opposite relationship is sealingly closed. In this case it would be possible for example for the front and rear window washing installation of a motor vehicle to be connected to the two upper outlets 7. A headlamp washer installation for example can be connected to the two lower outlets 7, with each outlet 7 serving a respective headlamp. That can be required for example for safety reasons, if the aim is to ensure that both headlamps are not cleaned at the same time, which would result in a sudden detrimental effect on vision and would require more pump output capacity.

By virtue of actuation of the solenoid 26 the rotor 24 as well as the armature 25 and the motor shaft 9 non-rotatably connected thereto move with the impeller 11 from the position shown in FIG. 11 into the position shown in FIG. 13. Consequently, the upper and lower chamber walls 15, 16, together with the pump housing 2 which are moved in the above-described manner together with the impeller 11, form a pump chamber which is disposed at the level of the lower outlets 7. With the impeller 11 in that position, only the two lower outlets 7 can be subjected to pressure selectively, depending on the respective direction of rotation of the DC motor 5.

Just as in the case of the washing fluid pump 1 in accordance with the first embodiment described with reference to FIGS. 1 to 9, the upper and lower chamber walls 15, 16 do not bear sealingly against the pump housing 2. The lower chamber wall 17 is provided with fluid apertures 22 therethrough, which ensure the intake of fluid to be pumped, into the pump chamber.

LIST OF REFERENCES

| | |
|---|---|
| 1 | washing fluid pump |
| 2 | pump housing |
| 3 | motor portion |
| 4 | hydraulic portion |
| 5 | DC motor |
| 6 | connecting terminals |
| 7 | outlets |
| 8 | intake |
| 9 | motor shaft |
| 10 | helix |
| 11 | impeller |
| 12 | impeller shaft |
| 13 | guide grooves |
| 14 | impeller blades |
| 15 | upper chamber wall |
| 16 | lower chamber wall |
| 17 | holding projections |
| 18 | guide grooves |
| 19 | collar |
| 20 | abutment shoulder |
| 21 | entrainment pins |
| 22 | fluid passages |
| 23 | gap |
| 24 | rotor |
| 25 | armature |
| 26 | solenoid |
| 27 | valves |
| 28 | valve bodies |
| 29 | grooves |

The invention claimed is:

1. A washing fluid pump for windows and/or headlamp cleaning installations on motor vehicles including at least one motor, at least one pump housing with at least one impeller arranged therein, at least one intake and at least two selectively actuable outlets for washing fluid, characterised in that the pump housing includes at least two pump chamber regions which are arranged in mutually superposed relationship, that at least two outlets are associated with different pump chamber regions, and the impeller is axially displaceably supported in the pump housing in such a way that it can assume its operative position selectively in one pump chamber region or the other and the two pump chamber regions are delimited by upper and lower chamber walls, which are arranged axially displaceably with the impeller in the pump housing, wherein said at least one intake is centrally and axially arranged and said at least two selectively actuable outlets are tangentially arranged with respect to the pump chamber regions.

2. A washing fluid pump according to claim 1 characterised in that the upper and lower chamber walls are guided non-rotatably in the pump housing.

3. A washing fluid pump according to claim 1 characterised in that one of the chamber walls and preferably the lower chamber wall is provided with at least one aperture therethrough as an intake for the fluid to be pumped.

4. A washing fluid pump according to claim 1 characterised in that the impeller is axially movably supported on a portion of the motor shaft, which portion is provided with a screwthread drive.

5. A washing fluid pump according to claim 4 characterised in that the impeller is movable between two end abutments of the screwthread drive between defined end positions.

6. A washing fluid pump according to claim 4 characterised in that the impeller is provided with upper and lower entrainment members which respectively co-operate with an entrainment profile of the end abutments.

7. A washing fluid pump according to claim 4 characterised in that the entrainment members provided on the impeller are in the form of entrainment pins.

8. A washing fluid pump according to claim 1 characterized in that the motor shaft is arranged axially movably.

9. A washing fluid pump according to claim 8 characterised in that the electric motor has an additional armature which is movable by ways of a switchable solenoid arranged in the motor housing.

10. A washing fluid pump according to claim 8 characterized in that there are four outlets of which two are respectively arrange in mutually superposed relationship.

11. A washing fluid pump according to claim 10 characterized in that two respective outlets can be respectively switched by way of a valve controllable by the fluid pressure.

12. A washing fluid pump according to claim 1 characterised in that the electric motor is in the form of a pole-commutable DC motor.

* * * * *